United States Patent [19]

Cohen

[11] Patent Number: 5,141,028

[45] Date of Patent: Aug. 25, 1992

[54] VALVE ASSEMBLY

[76] Inventor: Solly Cohen, P.O. Box 75525, Garden View, South Africa, 2047

[21] Appl. No.: 712,455

[22] Filed: Jun. 10, 1991

[30] Foreign Application Priority Data

Jun. 11, 1990 [ZA] South Africa .................. 90/4473

[51] Int. Cl.⁵ ........................................... F16K 3/24
[52] U.S. Cl. .......................... 137/625.3; 137/625.37; 251/282; 251/62; 251/48
[58] Field of Search .................... 251/282, 62, 48; 137/625.37, 625.3

[56] References Cited

U.S. PATENT DOCUMENTS

| 680,737 | 8/1901 | Schutte | 251/282 |
| 972,441 | 10/1910 | Durdin, Jr. | 251/282 X |
| 1,164,600 | 12/1915 | Forster | 137/625.37 |
| 2,211,319 | 8/1940 | Camerota | 251/282 X |
| 3,853,146 | 12/1974 | Blair | 251/282 X |

Primary Examiner—Arnold Rosenthal
Attorney, Agent, or Firm—Darby & Darby

[57] ABSTRACT

A high pressure valve assembly has a bore with a seat intermediate its ends and an inlet on one side an outlet on the other side of the valve. A double headed piston within the bore has a closure head between the seat and the outlet and a control head on the other side of the inlet to the seat. The control head has a slightly greater projected surface area facing towards the seat than the closure head. There is a cage between the seat and the outlet, which defines an annular chamber about the bore between the seat and the outlet, the chamber opening into the outlet. The cage has a number of rings of apertures spaced from the seat which are successively opened as the closure head moves away from the seat. The closure head extends beyond the apertures and has a "U"-seal at its downstream end. The control head also has a "U"-seal. The seals face towards the seat. The bore is closed by end caps. The valve assembly is manually operable or by means of a control fluid.

16 Claims, 3 Drawing Sheets

VALVE ASSEMBLY

This invention relates to a valve assembly. It relates more particularly to a valve assembly designed to control fluid flow in a medium to high pressure range with a high flow capacity.

According to the invention there is provided a valve assembly which includes an elongate hollow valve body which defines a bore therein;

a valve seat within the bore intermediate its ends;

an inlet defining means for defining an inlet to the bore on one side of the seat;

an outlet defining means for defining an outlet on the other side of the seat; and a piston within the bore, the piston having a closure head at a downstream end located on the outlet side of the seat and engageable therewith to close the bore and a control head at an upstream end on the other side of the inlet to the seat for reducing the force exerted on the closure head, in use.

Further, according to an important aspect of the invention the body may have a chamber defining means for defining an annular chamber about the bore between the outlet and the seat, with at least one communicating aperture between the chamber and the bore adjacent the seat and with the chamber opening into the outlet.

There may be a number of apertures arranged circumferentially and a suitable longitudinal distance from the seat, the closure head being sufficiently long to extend beyond the aperture furthest from the seat when in its closed position in contact with the seat.

A circumferential groove may be provided in the bore between the seat and a first ring of apertures.

The valve assembly may include a downstream sealing means for effecting sealing between the closure head and the bore downstream of the apertures, and an upstream sealing means for effecting sealing between the control head and the bore. These sealing means may include "U"-shaped seals which face towards the seat.

In a preferred embodiment, the control head may have a slightly greater projected surface area facing towards the inlet than the closure head.

The closure head and the control head may each have a guide ring for guiding movement thereof in the bore.

The bore may be closed at each end by means of a cap.

The valve assembly may be manually operable and may have a mechanical displacing means for displacing the piston in the bore. Alternatively, the valve assembly may be fluid operable with each cap having a port for connection to a fluid control system.

The seat may be of metal and the portion of the closure head engageable therewith may also be of metal.

The invention is now described, by way of examples, with reference to the accompanying drawings, in which.

Figure 1:
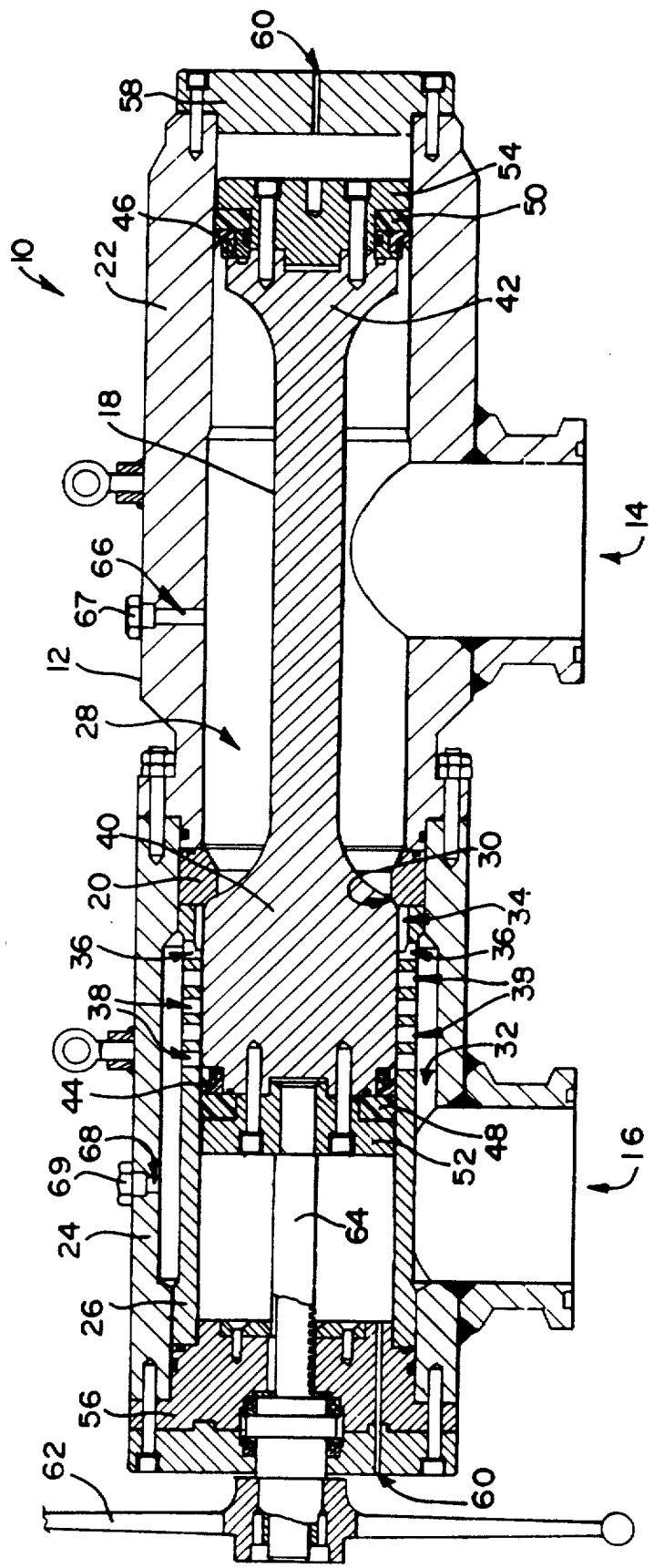
FIG. 1 shows a manually operable valve assembly in accordance with the invention.

Referring to FIG. 1, a manually operable valve assembly is designated generally by reference numeral 10. The assembly 10 has a body 12 with an inlet 14 and an outlet 16 with a double headed piston 18 and a seat 20 therein.

The body 12 is formed from three components, an upstream part 22, a downstream part 24 and a cage member 26. It will be noted that the seat 20 is held between the upstream part 22 and the cage member 26 with the cage member 26 and the upstream part 22 defining a bore 28 with the seat 20 intermediate its ends. It will thus be appreciated that the seat 20 is between the inlet 14 and the outlet 16 and has a seating surface 30 which faces towards the outlet 16. The seat 20 is of mild steel with a 1,2 mm thick coating of a hard metal which has a 62 RC hardness.

The cage member 26 is located on the downstream side of the seat 20 and the cage member 26 and the downstream part 24 define between them an annular chamber 32 which opens out into the outlet 16. The cage member 26 has, at its end adjacent the seat 20 an inner circumferential groove 34. At the downstream end of the groove 34, and in communication therewith, there is a first ring of circumferentially spaced apertures 36 in the cage member 26. These apertures 36 provide a flow path and communication between the groove 34 and the chamber 32. The cage member 26 has four further spaced rings of apertures 38 which provide further communication and a flow path between the bore 28 and the chamber 32.

The piston 18 is of mild steel and has a closure head 40 at one end and a control head 42 at its other end. As is seen in FIG. 1, the closure head 40 is on the downstream side of the seat 20, i.e. between the seat 20 and the outlet 16 and the control head 42 is on the other side of the inlet 14 to the seat 20. Furthermore, the closure head 40 contacts the seating surface 30 to close off the bore 28 between the inlet 14 and the outlet 16. Furthermore, the closure head 40 is sufficiently long so that when it is in contact with the seat 20 it extends beyond the furthest ring of apertures 38 from the seat 20. It is also to be noted that the control head 42 has a greater projected surface area facing towards the seat 20 than the closure head 40.

Sealing is effected between the closure head 40 and the cage member 26 by a "U"-seal 44 and between the closure head 42 and the upstream part 22 by means of a "U"-seal 46. The seals 44 and 46 face towards the seat 20. Movement of the piston 18 in the bore 28 is guided by means of guide rings 48 and 50. The seals 44 and 46 and the guide rings 48 and 50 are held in position by end plates 52 and 54 respectively. The seals 44 and 46 are located in circumferential rabbets at the outer ends of the closure head 40 and control head 42.

The bore 28 is closed at its ends by end caps 56 and 58. The end caps 56 and 58 have bleed passages 60.

The piston 18 is displaced within the bore 28 by means of a manually operable hand wheel 62 which is connected to the closure head 40 by means of a shaft 64 which passes through the end cap 56.

The upstream part 22 has an opening 66 which is closed by a plug 67 and the downstream part 24 has an opening 68 is which closed by a plug 69. With the manually operable embodiment shown in FIG. 1, the openings 66 and 68 are used to monitor pressures in the valve assembly 10.

It will be appreciated that with the piston 18 in the position shown in FIG. 1, in which the closure head 40 is seated against the seating surface 30, there is no communication between the inlet 14 and the outlet 16 and no fluid flows through the valve assembly 10. If the hand wheel 62 is rotated to move the closure head slightly away from the seat 20, fluid flows between the seat 20 and the closure head 40 into the groove 34, through the apertures 36 into the chamber 32 and out through the outlet 16. As the closure head 40 is moved further away from the seat 20, so the rate of flow increases. As the closure head 40 is displaced further, to open the apertures 38, the rate of flow is comparably increased until there is maximum flow when all the apertures 38 are open. Further, because the piston 18 is balanced as a result of the opposing forces being exerted on the closure head 40 and the control head 42 it is possible to operate the valve assembly manually without the need for a gearbox. It will also be appreciated, that because the control head 42 has a greater projected surface area than the closure head 40 a positive closing force is provided, with the bleed passages 60 providing dampening.

Figure 2:
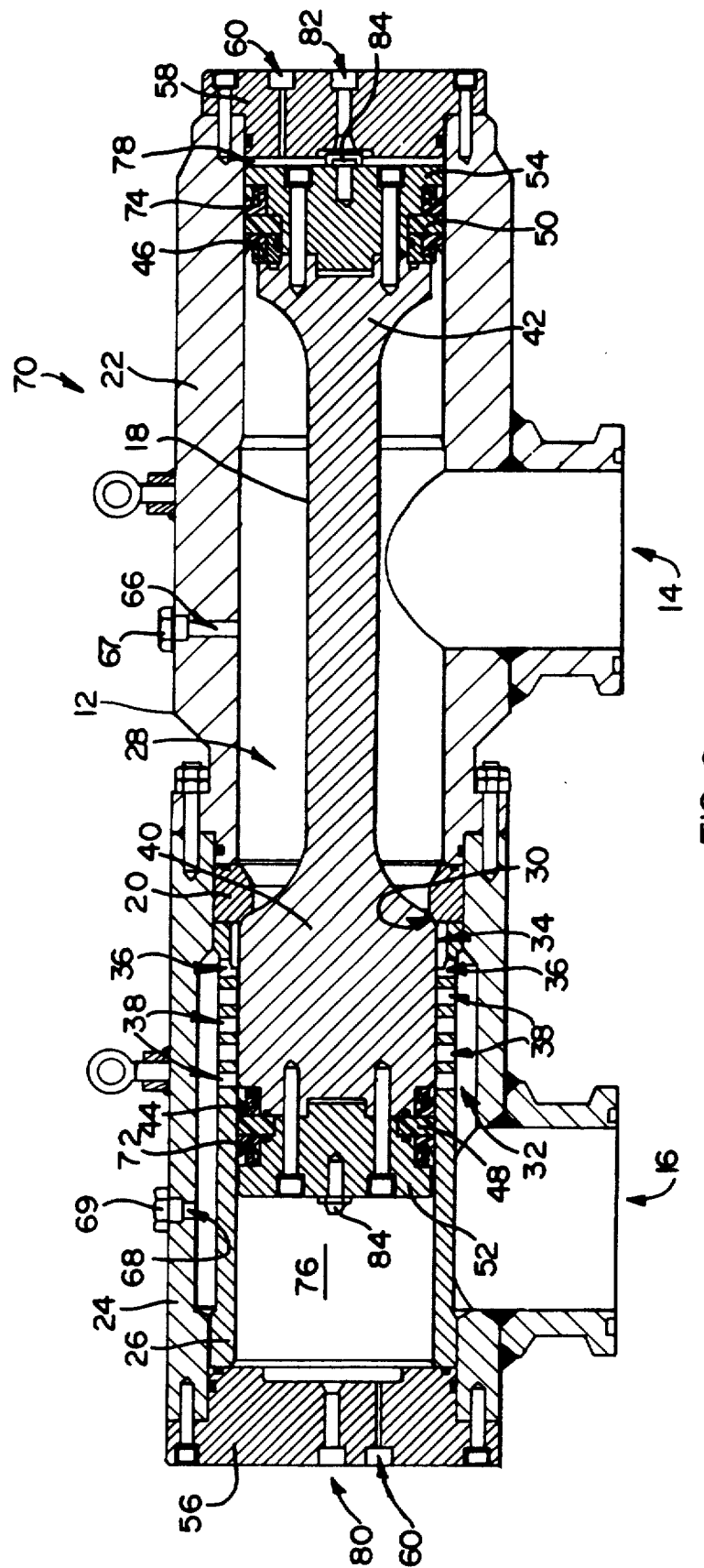
FIG. 2 shows a valve assembly in accordance with the invention that is fluid operable.
Figure 3:
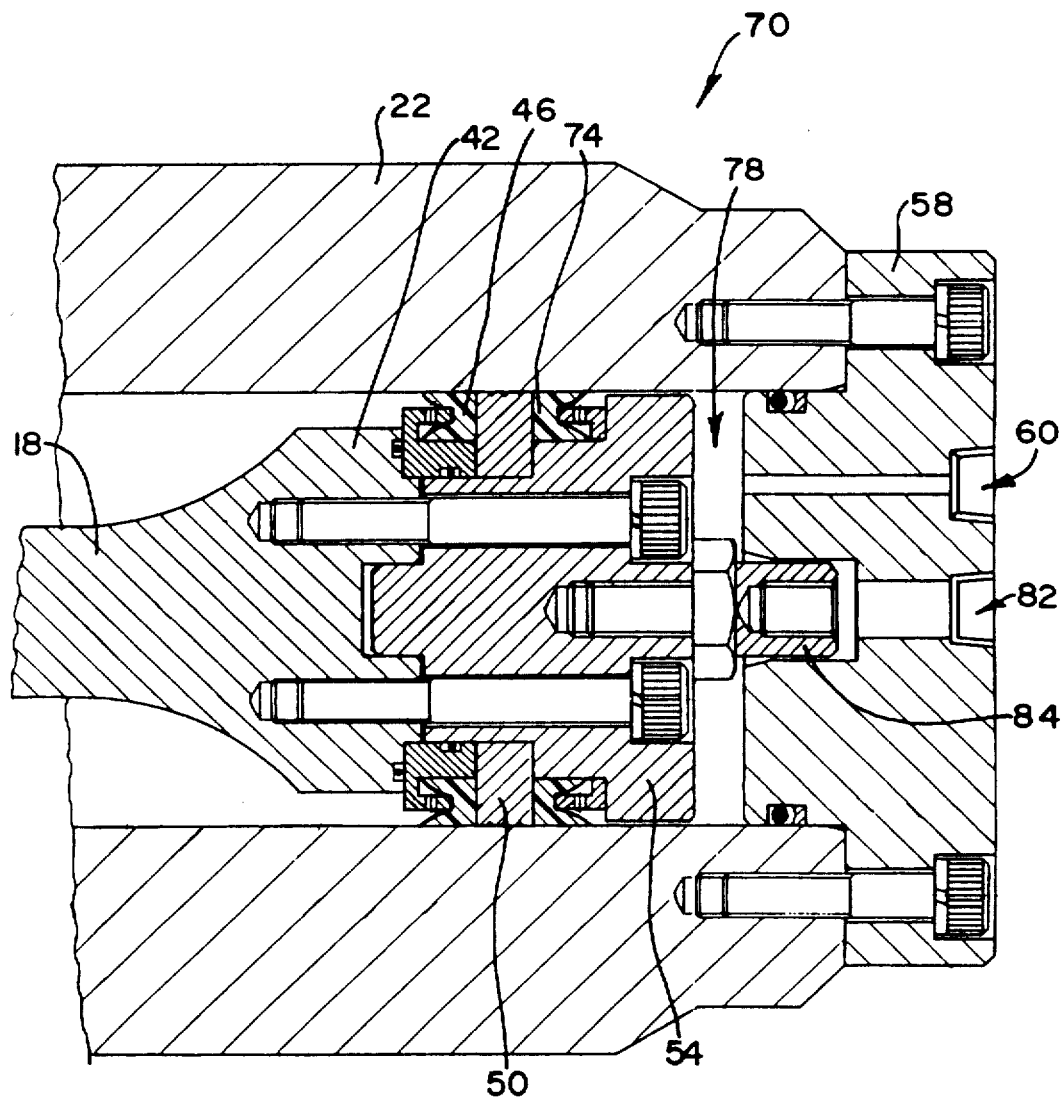
FIG. 3 shows in more detail a portion of the valve assembly of FIG. 2, and also shows a modification thereof.

Referring to FIG. 2 a further embodiment of a valve assembly in accordance with the invention is designated generally by reference numeral 70. The valve assembly 70 shown in FIG. 2 is similar to the valve assembly 10 of FIG. 1 and is similarly referenced. However, whereas the valve assembly 10 is manually operable, the valve assembly 70 is fluid operable.

It will be seen that the valve assembly 70 differs from the valve assembly 10 in that the assembly 70 has two further "U"-seals 72 and 74 which are carried by the closure head 40 and the control head 42 respectively and which face outwardly. Thus, chambers 76 and 78 are defined between the closure head 40 and the end cap 56 and the control head 42 and the end cap 58 respectively. The end cap 56 has a control port 80 and the end cap 58 a control port 82. The ports 80 and 82 are connected to a source of pressurised fluid (not shown) via a control valve (also not shown). The pressurised fluid may be from a separate source or may even be the fluid supplied to the inlet 14. If this is the case, the control valve may be connected to the opening 66 to supply pressurised fluid either to the chamber 76 to close the valve assembly 70 or to the chamber 78 to open the valve assembly 70. It will further be appreciated that the bleed passages 60 will normally be closed by means of plugs (not shown). The valve assembly 70 also has throttling pin 84 which project outwardly from the end plates 52 and 54 and which are aligned with the ports 80 and 82. The pins 84 enter the ports 80 and 82 when the piston 18 is at its end limits, thereby impeding flow of control fluid through the ports 80 and 82 and thereby providing a dampening effect.

It will be appreciated, that because the seat 20 is specially hardened it provides high abrasion and corrosion resistance. Valve assemblies such as those shown in the drawings can operate at a pressure of up to 25 MPa. Further, a valve assembly as shown which has a bore with a diameter of about 200 mm, can accommodate a flow rate of about 300 liters per second.

Valve assemblies as shown have a low noise level at high flow rates, provide a tight shut-off together with a low pressure drop capacity with minimal cavitation.

I claim:

1. A valve assembly comprising:
   an elongate hollow valve body which defines a bore therein;
   a valve seat within the bore intermediate its ends;
   an inlet defining means for defining an inlet to the bore on one side of the seat;
   an outlet defining means for defining an outlet on the other side of the seat; and
   a piston within the bore, the piston having a closure head at a downstream end located on the outlet side of the seat and engageable therewith to close the bore, and a control head at an upstream end on the other side of the inlet away from the seat for reducing the force exerted on the closure head, in use, said control head having a slightly greater projected surface area facing towards the inlet than the closure head;
   said body having chamber defining means for defining an annular chamber about the bore between the outlet and the seat, a plurality of apertures communicating between the annular chamber and the bore adjacent the seat, said chamber opening into the outlet, said apertures being arranged circumferentially and a suitable longitudinal distance from the seat, the closure head having a length sufficient to extend beyond and block the aperture furthest from the seat when said closure head is in its closed position in contact with the seat, said chamber defining means including a circumferential groove in the bore between the seat and a first ring of said apertures.

2. The valve assembly as in claim 1, further comprising a downstream sealing means for effecting sealing between the closure head and the bore downstream of the apertures.

3. The valve assembly as claimed in claim 1, which includes an upstream sealing means for effecting sealing between the control head and the bore.

4. The valve assembly as claimed in claim 2, in which the downstream sealing means includes a "U"-shaped seal which faces towards the seat.

5. The valve assembly as claimed in claim 3, in which the upstream sealing means includes a "U"-shaped seal which faces towards the seat.

6. The valve assembly as claimed in claim 2, which includes a guide ring fast with the closure head for guiding movement of the closure head in the bore.

7. The valve assembly as claimed in claim 3, which includes a guide ring fast with the control head for guiding movement of the control head in the bore.

8. The valve assembly as claimed in claim 1, which includes a cap at each end of the body.

9. The valve assembly as claimed in claim 8, which includes a manually operable mechanical displacing means for displacing the piston in the bore.

10. The valve assembly as claimed in claim 1, in which the seat is of metal and the portion of the closure head engageable therewith is also of metal.

11. A valve assembly comprising:
    an elongate hollow valve body which defines a bore therein;
    a valve seat within the bore intermediate its ends;
    an inlet defining means for defining an inlet to the bore on one side of the seat;
    an outlet defining means for defining an outlet on the other side of the seat; and
    a piston within the bore, the piston having a closure head at a downstream end located on the outlet side of the seat and engageable with said seat to close the bore, and a control head at an upstream end on the other side of the inlet away from the seat for reducing the force exerted on the closure head, in use, said control head having a slightly greater projected surface area facing towards the inlet than the closure head;

a cap at each end of the body; and displacing means for moving the piston in the bore, said displacing means being manually operable.

12. The valve assembly as in claim 11, further comprising apertures in said bore located between said seat and said outlet, and a downstream sealing means for effecting sealing between the closure head and the bore downstream of the apertures.

13. The valve assembly as in claim 11, further comprising an upstream sealing means for effecting sealing between the control head and the bore.

14. The valve assembly as in claim 13, wherein the upstream sealing means includes a "U"-shaped seal which faces towards the seat.

15. The valve assembly as in claim 11, further comprising a guide ring fast with the control head for guiding movement of the control head in the bore.

16. The valve assembly as in claim 11, wherein the seat is of metal and the portion of the closure head engageable therewith is also of metal.

* * * * *